W. WELKE.
PLANTER ATTACHMENT.
APPLICATION FILED APR. 10, 1920.
1,388,498.
Patented Aug. 23, 1921.
2 SHEETS—SHEET 1.
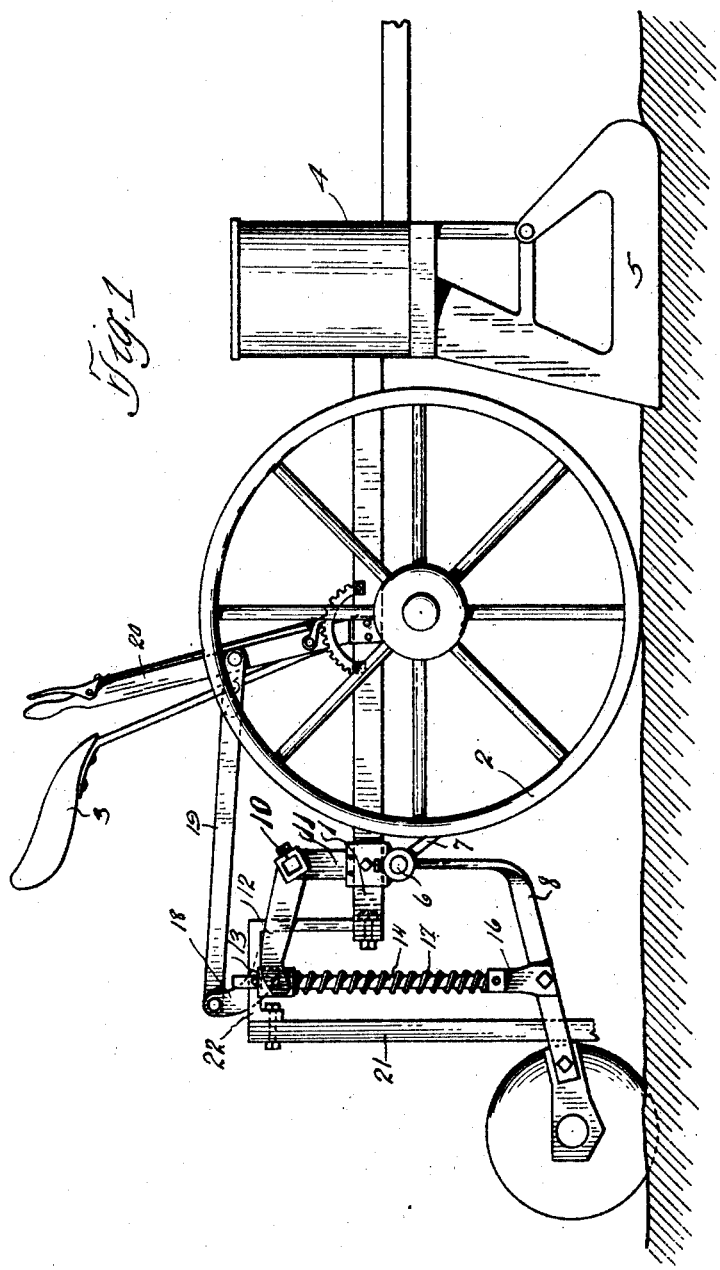

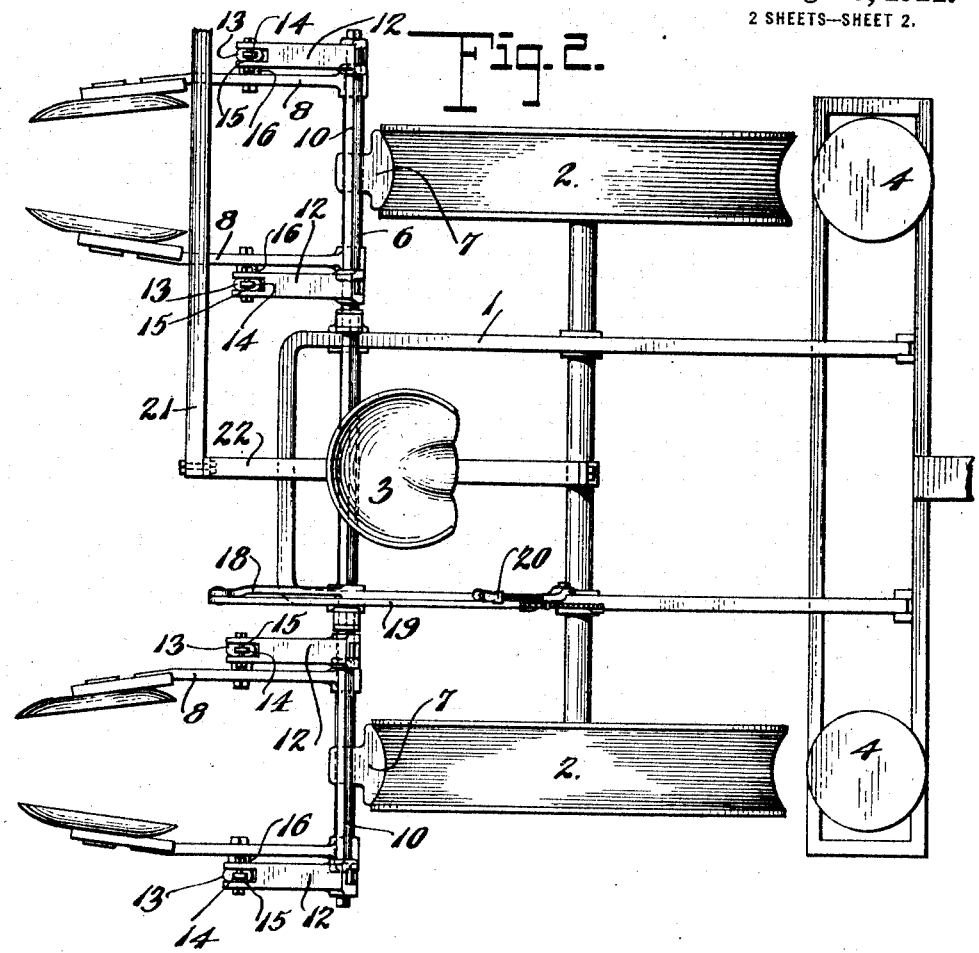
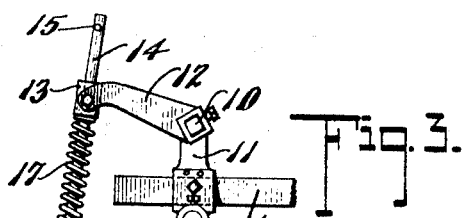

UNITED STATES PATENT OFFICE.

WILLIAM WELKE, OF CLEGHORN, WISCONSIN.

PLANTER ATTACHMENT.

1,388,498. Specification of Letters Patent. Patented Aug. 23, 1921.

Application filed April 10, 1920. Serial No. 372,905.

*To all whom it may concern:*

Be it known that I, WILLIAM WELKE, a citizen of the United States, residing at Cleghorn, in the county of Eau Claire and State of Wisconsin, have invented certain new and useful Improvements in Planter Attachments, of which the following is a specification.

The present invention relates to attachments for agricultural implements, particularly cornplanters, and has for its object to provide means for listing up the soil over the row or rows in which the seed has been planted so as to form a covering ridge which will permit the subsequent cultivation of the seeded area without exposing or uncovering the seed bed.

My main object is to provide an attachment of this character in the form of a unit complete in itself and capable of connection to the conventional planter implement, and embodying adjustable soil working elements designed to be independently adjusted to control their relation with respect to each other, and independently yieldable so as to pass over obstructions which may be met with in performing their functions.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a side elevation of a cornplanter having my attachment applied thereto.

Fig. 2 is a top plan thereof; and

Fig. 3 is a detail fragmentary view showing the manner in which the earth working elements yield in meeting with obstructions.

Throughout the following detailed description and on the several figures of the drawings, similar parts are referred to by like reference characters.

In the drawings I have shown my invention as applied to a conventional cornplanter, which is more or less diagrammatically shown, since my invention does not reside in any of its details of construction. The numeral 1 designates the planter frame mounted upon the ground wheels 2 and provided with a seat 3 and seed planting instrumentalities at the forward end, indicated at 4. As the seed in this type of planter is deposited in its furrow opened by the shoe 5, the concave wheel 2 operating thereover slightly covers and packs the bed, but the seed are not sufficiently protected by such operation to permit the surface of the soil to be worked over, as for example, to prevent the grass or weeds from growing and interfering with the growth of the grain until the latter has obtained a start, it being quite well known that the grass and weeds are of quicker growth and therefore cultivation or working of the earth is very essential. To run harrows or other implements over the ground, however, would uncover some of the seed or uproot it, and hence my object is to throw up a ridge of earth upon the seed row so that the seed will be protected against this.

To this end I provide an attachment designed as stated to be applied to the planter without modifying in any way its construction. At the rear of the planter is usually provided a transverse scraper shaft 6, journaled in the frame 1 and carrying scraper members 7 engaging with the surfaces of the wheels 2 to keep the soil from adhering to the wheels. Upon this shaft I slide a pair of disk supporting arms at each end, held in place by locking collars 9, one of such collars for each arm being sufficient in view of the connecting parts later described.

Upon the outer end of each arm 8 is journaled a disk, set at an angle as shown, so that each coöperating pair of disks will list up the soil into a ridge directly upon the seed row just in rear of the wheel. Setting the arms closer or farther apart is merely a matter of adjustment within the requirements of the operator.

In conjunction with these earth working members I employ means for imparting pressure thereto and for raising or lowering them to and from operative position. This consists of an operating shaft 10 arranged above the scraper shaft and connected to the frame 1 by means of the bearing supports 11 bolted in their upright positions through openings usually found in the planter frame and used also for connecting the bearing supports for the shaft 6. From this shaft 10 extend rearwardly the arms 12, one for each disk arm, and on the outer end of each of said arms is secured a guide sleeve 13 through which extends the vertical guide rod 14 having a stop pin 15 at its upper end and pivotally connected at its lower end to the member 16 which is attached to the arm 8 intermediate its length. A spring 17 surrounds the rod 14 between the sleeve 13 and the part 16 so as to permit of yielding when the disk meets with an obstruction, after the manner shown in Fig. 3. This connection to the disk arms tends to hold the same in place so that only one collar 9 for each of the arms is required as above stated.

Also extending rearwardly from the shaft 10 is a lifting arm 18 which is connected by the link 19 to the shifting lever 20 secured upon the implement adjacent to the seat 3. The connection with this lever is such that movement of the same forwardly will raise all of the earth working elements simultaneously into elevated position where they are inoperative while movement in the reverse direction will depress them into engagement with the earth as customary and provide sufficient pressure through the yielding connection to insure proper depth of travel of the disks.

As customary a marker is employed with this apparatus and the rod 21 therefor is pivotally connected to the bracket arm 22 at the rear of the frame 1. This rod 21 extends over either pair of the disk arms 8, depending upon which side it is arranged, and therefore is engaged by said arms when they are raised into inoperative position. Thus I employ my attachment as the instrumentality for moving the marker to and from operative position with the earth working elements of said attachment. Much time and trouble is thereby saved.

The operation of the device will be clear from the foregoing and it will be apparent that I thereby provide a useful improvement in the form of an attachment complete in itself for connection with the standard implement at very nominal expense and trouble.

Having thus described my invention, what I claim as new is:

1. A coverer attachment for a planter or similar implement having furrow opening tools and a transversely extending shaft, said attachment comprising disk carrying arms pivotally mounted upon said shaft in pairs, each pair of arms being spaced apart upon opposite sides of the path of a furrow opening tool, disks mounted upon said arms in rear of said furrow opening tools, a controller shaft journaled upon said planter above said transversely extending shaft, arms arranged upon said controller shaft in spaced relation to correspond with the disk carrying arms, yieldable connecting means between each of said last mentioned arms and its corresponding disk carrying arm whereby said arms are adapted to yield vertically independently of each other, and a lever connected to said controller shaft for operating the same to simultaneously raise or lower all of said disks.

2. A coverer attachment for a planter or similar implement having furrow opening tools and a transversely extending shaft, said attachment comprising disk carrying arms pivotally mounted upon said shaft in pairs, each pair of arms being spaced apart upon opposite sides of the path of a furrow opening tool, disks mounted upon said arms in rear of said furrow opening tools, a controller shaft journaled upon said planter above said transversely extending shaft, arms arranged upon said controller shaft in spaced relation to correspond with the disk carrying arms, said controller arms being provided with guide sleeves at their free ends, rods pivotally connected to said disk carrying arms and slidably engaging said guide sleeves, springs surrounding said rods between said sleeves and disk carrying arms, stop members upon the free ends of said rods, and a lever connected to said controller shaft for operating the same to simultaneously raise or lower all of said disks.

In testimony whereof I affix my signature.

WILLIAM WELKE.